US006120916A

United States Patent [19]

Delvinquier et al.

[11] Patent Number: 6,120,916

[45] **Date of Patent: *Sep. 19, 2000**

[54] COMPOSITE MAGNETIC MATERIAL WITH REDUCED PERMEABILITY AND LOSSES

[75] Inventors: Jean-Pierre Delvinquier, Les Ulis; Richard Lebourgeois, Villebon S/Yvette; Michel Pate, Nozay; Claude Rohart, Palaiseau, all of France

[73] Assignee: Thomson-CSF, Paris, France

[ * ] Notice: This patent issued on a continued prosecution application filed under 37 CFR 1.53(d), and is subject to the twenty year patent term provisions of 35 U.S.C. 154(a)(2).

[21] Appl. No.: 08/711,272

[22] Filed: Sep. 9, 1996

[30] Foreign Application Priority Data

Sep. 19, 1995 [FR] France ........ 95 10952

[51] Int. Cl.[7] ........ B32B 5/22; B32B 31/00

[52] U.S. Cl. ........ 428/692; 428/693; 336/233; 427/547; 427/548; 427/549; 427/550; 264/108

[58] Field of Search ........ 252/62.64, 62.54; 428/694 BA, 694 BH, 692; 427/558, 547, 548, 549; 336/233; 264/108

[56] References Cited

U.S. PATENT DOCUMENTS

| | | | |
|---|---|---|---|
| 3,255,052 | 6/1966 | Opitz | 336/233 |
| 3,535,200 | 10/1970 | Bergstom | 336/233 |
| 3,927,930 | 12/1975 | Goldberg et al. | 427/547 |
| 4,552,808 | 11/1985 | Fujiyama et al. | 252/62.54 |
| 4,595,440 | 6/1986 | Lynch | 427/548 |
| 5,413,903 | 5/1995 | Jeffers | 428/694 BA |
| 5,643,686 | 7/1997 | Isshiki et al. | 427/548 |
| 5,700,594 | 12/1997 | Jeffers | 428/694 BA |
| 5,748,013 | 5/1998 | Beauclair et al. | 336/233 |

FOREIGN PATENT DOCUMENTS

| | | |
|---|---|---|
| 0 044 592 A1 | 1/1982 | European Pat. Off. . |
| 044 592 | 1/1982 | European Pat. Off. . |
| 42 14376 A1 | 11/1993 | Germany . |

OTHER PUBLICATIONS

Klein, Cornelius et al. . Manual of Mineralogy. New York: John Wiley and Sons. pp. 308, 310, 311, 1985.

*Primary Examiner*—Christopher D. Rodee
*Attorney, Agent, or Firm*—Oblon, Spivak, McClelland, Maier & Neustadt, P.C.

[57] ABSTRACT

A composite magnetic material showing reduced losses and reduced permeability when it is subjected to a magnetic field at frequencies below approximately 100 MHz. It comprises magnetic particles in the form of wafers dispersed in a dielectric binder. The polycrystalline magnetic ceramic wafers are oriented so that their main faces are substantially parallel to the magnetic field.

Application especially to cores of inductors or transformers.

7 Claims, 3 Drawing Sheets

COMPOSITE MAGNETIC MATERIAL WITH REDUCED PERMEABILITY AND LOSSES

BACKGROUND OF THE INVENTION

1. Field of the Invention

The present invention relates to a composite magnetic material with reduced permeability and losses at frequencies below about 100 MHz.

The material is designed especially for making inductor cores or transformer cores.

2. Description of the Prior Art

In the development of electronic systems, it is sought to miniaturize the supply sources. The change from linear structure regulators to switched-supply converters is a decisive step in reducing the amount of space used and in improving the performance characteristics of the supply sources. The switching frequency has been constantly increasing with a view to further miniaturization. Present-day converters attain and even exceed frequencies of one MHz. Architectures using low value inductance (in the range of some micro-Henrys) are likely to have low total losses (conductor and magnetic circuit losses) under high induction and low permeability (below 200 approximately).

Magnetic materials with reduced permeability currently available on the market have very high losses under high induction (of over 10 mT). This means that, today, magnetic components are the bulkiest part of the converters. For existing magnetic materials, the low permeability and low losses at high frequency are contradictory characteristics.

An inductor with an inductance value of some micro-Henrys will have a few turns or a core with low permeability.

A small number of turns taken to a high potential difference generates high magnetic induction in the core. Since the losses in the core are at least proportional to the square of the induction, they grow very rapidly when the number of turns decreases. To obtain smaller losses, it is necessary to have a large number of turns. This requires a core with low permeability.

There are air-based inductors with non-magnetic cores. Their permeability is equal to one and the losses in the core are zero. Their size is great because of the permeability of the non-magnetic core which is equal to one. The "copper" losses dissipated by the coil are great. The electromagnetic disturbances generated are troublesome for the vicinity and difficult to eliminate.

There are magnetic core inductors made of localized air gap spinel-type massive ferrite. The ferrite, despite its losses in the range of one-hundredth or one-tenth $W/cm^3$, depending on the induction and the frequency, has permeability values in the region of 1000. This is far too high for the application of the converters. Ferrites with low permeability such as nickel ferrite which have permeability of 10 have excessively high losses for the application of the converters.

There also exist inductors with distributed gap composite magnetic cores. These materials are formed by ferromagnetic alloys made of powder dispersed in a dielectric binder. The losses by radiation are smaller than those of localized gap cores. There are essentially two categories of powders: powdered iron and carbonyl iron powder whose permeability ranges from 5 to 250 approximately and powders based on iron-nickel alloys whose permeability ranges from 14 to 550 approximately.

The losses in these materials are fifteen to twenty times greater than those of massive power ferrites under the same conditions of frequency, induction and temperature.

For example, the best composite magnetic materials on the market have the following characteristics (according to data from the supplier's catalog) for toroidal or ring-shaped samples having an average diameter of 10 mm, at ambient temperature, for an induction value of 30 mT at 1 MHz:

carbonyl iron: losses of over 1.5 $W/cm^3$ nickel iron: losses of over 2 $W/cm^3$.

SUMMARY OF THE INVENTION

The present invention proposes a composite magnetic material which, when it is subjected to a magnetic field, has both smaller losses and smaller permeability for frequencies of less than about 100 MHz.

This composite magnetic material has losses about three to five times smaller than those of the composite magnetic materials available on the market and a permeability of about 10 to 100 times smaller than that of spinel-type ferrites at frequencies of less than about 100 MHz.

More specifically, the composite magnetic material according to the invention comprises magnetic particles dispersed in a dielectric binder, these particles being wafers of polycrystalline magnetic ceramic oriented so that their main faces are substantially parallel to the magnetic field.

The polycrystalline magnetic ceramic is advantageously a spinel-type ferrite corresponding to the formula $M_xZn_yFe_{2+\epsilon}O_4$ with $x+y+\epsilon=1$ where M is a manganese ion or a nickel ion.

The binder is advantageously a resin, which is a fluid in a first stage and is then hardened, for example a resin of the epoxy, phenolic, polyimide or acrylic-based type.

The wafers are oriented in strata, separated by binder. Each stratum may have several wafers separated by binder forming a gap or a single wafer.

The wafers belonging to neighboring strata preferably are in a staggered arrangement or in columns.

Several shapes of wafers can be envisaged, especially the square shape, the toroidal shape or the shape of a toroidal portion. The choice depends on the final shape of the magnetic core made with the material thus obtained.

The present invention also relates to a method for the making of such a composite magnetic material. This method comprises the following steps:

the making of a ceramic magnetic powder;

the making, from the ceramic magnetic powder, of a casting slip;

the cutting out of the wafers from a film of the casting slip;

the sintering of the wafers;

the preparing of the composite magnetic material from the sintered wafers, dispersed in the binder, the main faces of which are oriented with respect to the magnetic field.

The casting slip can be obtained by mixing the ceramic powder, at least one binder, at least one solvent and possibly a deflocculant.

The orientation of the wafers may be done by hand. It is possible to stack the wafers on one another and then compress them in order to break them.

It is possible to deposit them one beside the other, stratum by stratum.

The orientation can be done by vibration as well as by a magnetic field.

The invention also relates to a core made with a composite magnetic material of this kind as well as with an inductor or transformer comprising a core of this kind.

BRIEF DESCRIPTION OF THE DRAWINGS

The invention will be understood more clearly and other advantages will appear from the following description, given by way of a non-restrictive example and from the appended figures, of which.

MORE DETAILED DESCRIPTION

Figure 1:
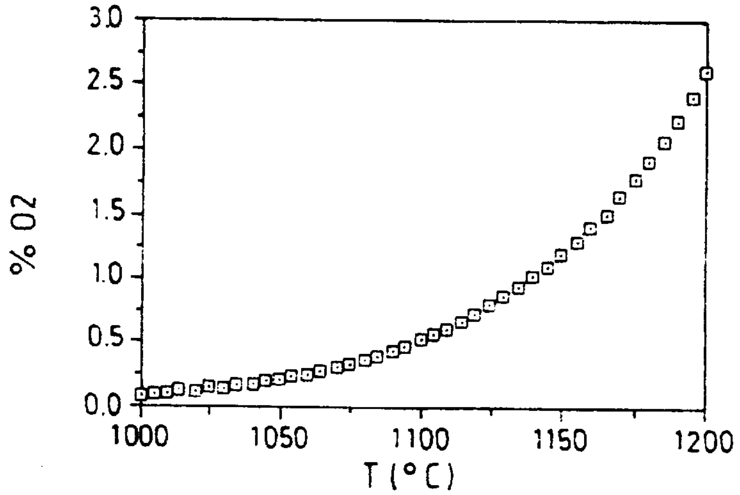
FIG. 1 shows the development of the percentage in oxygen of the atmosphere during the cooling stage of the sintering of the wafers.

The composite magnetic material according to the invention has polycrystalline magnetic ceramic wafers dispersed in a binder. The main faces of the wafers are oriented substantially in parallel to the magnetic field.

The magnetic ceramic may be a spinel-type ferrite corresponding to the formula $M_xZn_yFe_{2+\epsilon}O_4$ with $x+y+\epsilon=1$ where M is a manganese ion or a nickel ion.

When they are massive, these ferrites have a permeability of 500 to 3000.

The method of preparing composite magnetic materials according to the invention makes it possible to control the shape of the wafers and their positioning in the composite material so as to control its permeability and its losses.

The wafers of ceramic material can be prepared by means of a standard technique for the preparation of ceramics. This technique is used especially for the manufacture of alumina substrates, packages or multilayer ceramic capacitors.

After weighing, the raw materials needed to obtain the magnetic ceramic may be mixed or crushed in a jar containing steel beads in aqueous phase. This operation is designed to mix or reduce the size of the grains of the different constituent elements in order to make them more reactive. The mixture is then dried and screened. The powder thus obtained may pre-sintered in an oven so as to obtain a desired crystalline phase. This operation is often called "chamottage".

A second crushing operation may follow the "chamottage" to reduce the grains that have swelled during this operation of "chamottage". This second crushing can be done under the same conditions as the first crushing.

A casting slip can be obtained by mixing the re-crushed powder with organic binders, solvents and possibly a deflocculant. This mixture can be made in a jar with steel beads by means of a mechanical shaker. The compound, after being allowed to rest, to give the air bubbles formed during the shaking the time to rise, is cast in the form of a strip on a bed on which there slides a mylar band for example, driven at a constant speed. The bed is covered with a tunnel to prevent a deposit of dust and to slow down the evaporation of the solvents. A knife held parallel to the mylar band by micrometrical screws forms an opening through which the slip passes. This opening determines the thickness of the strip cast. After evaporation and drying, the cast strip may be detached and cut out by means of a punch. This facility of obtaining complex parts, toroid-shaped for example, is very useful. The machining of massive ferrites is slow and costly for it requires diamond-tipped tools.

These wafers may be cut out into squares for example, 2 mm×2 mm or 4 mm×4 mm or 7 mm×7 mm. Thin toroids or portions of toroids (eighth-, quarter- or half-rings) may also be cut out.

After the cutting-out operation, the wafers are sintered to provide for the cohesion of the powder grains.

The sintering is done especially for the ferrites Mn—Zn under controlled partial oxygen pressure in order to set the rate of divalent iron in the wafers.

In a final step, the wafers are oriented and incorporated into a fluid binder, an Araldite type resin for example, that provides for the mechanical cohesion of the composite material after hardening.

Exemplary Method of Manufacture

The making of a composite magnetic material according to the invention designed to work at frequencies below about 100 MHz.

The initial components are weighed:

193.37 g of $Fe_2O_3$ 95.75 g of $MnCO_3$ 17.52 g of ZnO 0.53 g of $TiO_2$ 1000 ppm of CaO The crushing is done with steel beads in de-ionized water.

After crushing, the mixture is dried in a stove and sifted through a screen with an aperture of 400 μm.

The chamottage is done at 1100° C. with a three-hour plateau under air.

The second crushing is done under the same conditions as the first one, it is followed by another drying and screening operation.

The casting slip is prepared with:

the powder obtained previously;

two solvents: ethanol and trichlorethylene;

organic binders: polyethylene-glycol, diethylhexylephthalate and polyvinyl-butyral;

a deflocculant if necessary.

These constituents are mixed and shaken with steel beads for 3 hours. A resting period of about half an hour precedes the casting.

After drying, the wafers are cut out and then sintered.

The sintering is done in the following cycle:

a rise in temperature at 600° C. for 12 hours under air;

a rise in temperature from 600° C. to 1220° C. in 6 hours;

a plateau at 1220° C. for 1 hour 30;

a fall in temperature from 1220° C. to 1200° C. with an adjustment of the oxygen percentage at 2.6% in the atmosphere in 15 minutes;

a plateau at 1200° C. for 15 minutes with the same percentage of oxygen;

a cooling at a rate of 100° C. per hour with a drop in the percentage of oxygen according to the following relationship: $\log(PO_2)=f(1/T)$ shown in FIG. 1. $PO_2$ is the percentage of oxygen and T is the temperature.

After sintering, the thickness of the wafers varies from 100 μm to 130 μm.

The resin is poured before or after the orientation. This depends on the method of orientation used.

The orientation may be done by hand. This method can be applied to wafers of larger sizes, in particular toroidal shapes, toroidal portions, and 7 mm×7 mm squares.

Figure 2A:
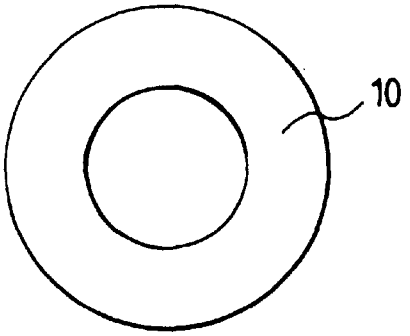
FIGS. 2*a*, 2*b*, 2*c*, 2*d* show two examples of a core according to the invention from a top view and a sectional view made with toroid-shaped wafers.
Figure 2B:
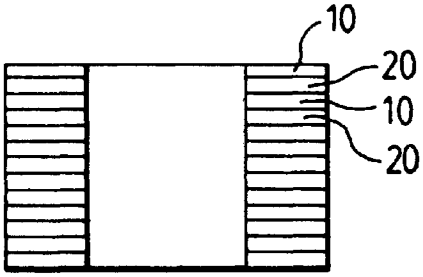

FIGS. 2*a*, 2*b* show a toroidal core made of magnetic material according to the invention. It is made out of toroid-shaped wafers 10. Several of them are stacked one on top of the other in strata. The stack is placed in a mold and the binder 20, which is a resin of the epoxy, phenolic, polyimide or acrylic-based type for example, is poured.

The binder 20 fills the spaces between the different strata.

Figure 2C:
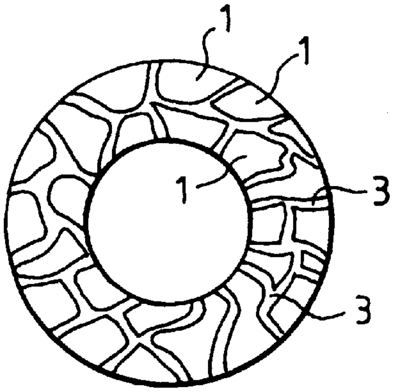
Figure 2D:
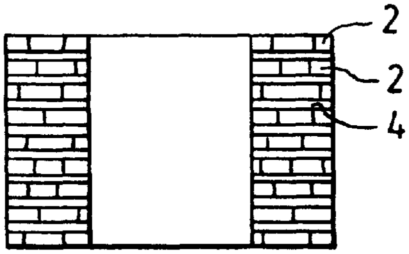

To improve the performance characteristics of a core of this kind, it is possible, after having stacked the wafers 10, to compress them so as to break them into pieces 1. It is preferable beforehand to join the wafers 10 together using for example double-sided adhesive tape. The binder is then added. FIG. 2*c* shows a top view of a toroidal core obtained with this method in FIG. 2*d* is a cross-section thereof. The different strata bear the reference 2. The binder fills the spaces firstly between the broken pieces 1 of one and the same toroid and secondly between the different strata 2 of toroids.

The pieces 1 are then separated by gaps 3 of resin. Two strata 2 are also separated by a layer 4 of resin.

The binder is initially fluid and then hardens.

Figure 3A:
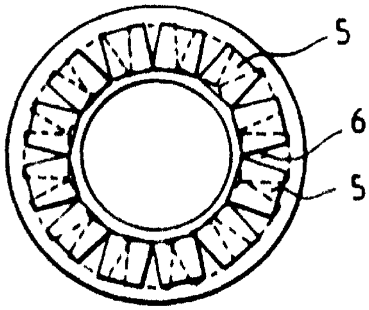
FIGS. 3*a*, 3*b* show another example of a core according to the invention in a top view and a front view.
Figure 3B:
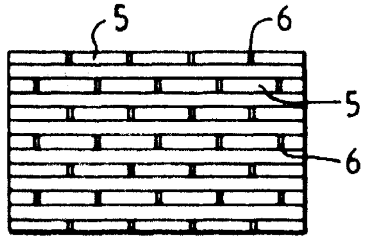

FIGS. 3*a*, 3*b* show a variant of a toroidal core according to the invention. It is obtained out of square wafers 5. They are placed stratum by stratum beside one another flat, in the form of a crown, leaving a space 6 or a gap between them. The wafers of two neighboring strata are placed in a staggered arrangement.

Figure 4A:
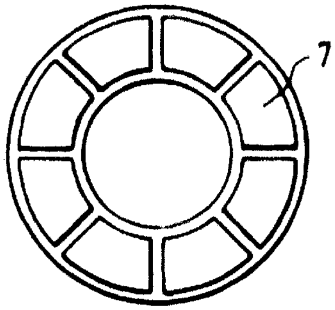
FIGS. 4*a*, 4*b* show yet another example of a core according to the invention in a top view and a front view.
Figure 4B:
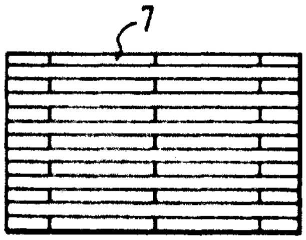

FIGS. 4*a*, 4*b* show yet another variant of a toroidal core according to the invention. The wafers 7 constitute eighths of a toroid. They are positioned stratum by stratum, flat against one another, in the form of a crown, in leaving a space or gap between them. The wafers 7 of two neighboring strata coincide. They form columns. They could have been placed also in a staggered arrangement as in FIGS. 3*a*, 3*b*.

Instead of carrying out the operation of orienting the wafers by hand, it is possible to do so by vibration using a vibrating spatula for example. This method, which can be used for an industrial-scale application, is appropriate for smaller wafers.

Another method that can be used for an industrial-scale application and is appropriate for small-sized wafers is that of magnetic orientation. It leads to higher precision than orientation by vibration.

The wafers are placed in a transparent receptacle closed by a plug having a hole in it. The receptacle is placed in the gap of an electromagnet. A magnetic field is created in the gap. By causing the receptacle to rotate on itself in the magnetic field, the wafers get arranged evenly in several strata and visual control is easy. The position of the wafers may be fixed by pushing the plug to keep the strata in contact.

In the latter two methods, the binder may be added before or after the orientation.

Depending on the frequencies of use and the desired apparent permeability of the composite magnetic material, a massive ferrite is chosen. This ferrite is optimized in frequency and the dimensions of the gaps between wafers are determined.

Figure 5A:
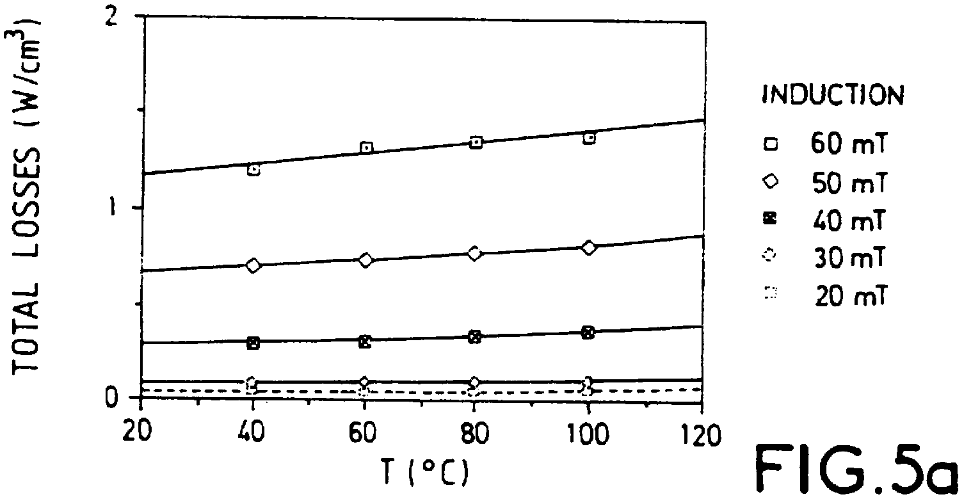
FIGS. 5*a*, 5*b* show the development of the total losses of a core according to the invention as a function of the temperature and the induction respectively at 300 kHz and 1 MHz (measurements made in the laboratory)
Figure 5B:
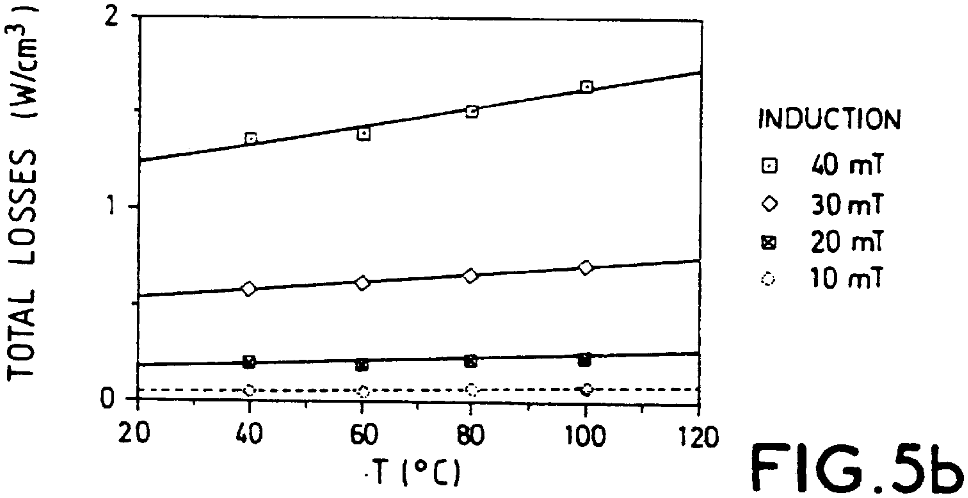

Measurements of total losses per unit of volume of a core according to the invention made of composite magnetic material as a function of the temperature and induction have been entered in the graphs of FIGS. 5*a* and 5*b*. These measurements are made for a toroid consisting of ferrite MnZn wafers at a frequency of 300 kHz for FIG. 5*a* and a frequency of 1 MHz for FIG. 5*b*. In both cases, the rate of charge per volume of the magnetic wafers is 42%.

Very low losses are observed over a wide range of temperatures and these losses are compatible with the majority of the applications of the converters. The magnetic cores have greater temperature stability as shown in FIGS. 5*a*, 5*b*.

Under the same conditions, at 1 MHz, the losses of a carbonyl iron composite toroid at 30 mT are at least 2.5 W/cm$^3$ at 80° C.

A core according to the invention has losses equal to 0.5 W/cm$^3$ as shown in FIG. 5*b*, whence a gain of a factor 5.

The following tables show the values of the total losses per unit of volume (W/cm$^3$) as a function of the induction B, at 1 MHz for different variants of toroidal cores according to the invention.

4 mm×4 mm Wafers Placed in a Staggered Arrangement:

rate of charge per volume ranging from 21% to 29% permeability 17

| | Total losses at | | | |
|---|---|---|---|---|
| | T = 30° C. | T = 60° C. | T = 80° C. | T = 100° C. |
| B = 10 mT | 0.13 | 0.16 | 0.16 | 0.16 |
| B = 20 mT | 0.66 | 0.66 | 0.8 | 0.9 |
| B = 30 mT | 2.2 | 2.3 | 2.35 | 2.5 |

4 mm×4 mm Wafers in Columns rate of charge per volume ranging from 18 to 25% permeability 17

T=30° C.

| | Total losses |
|---|---|
| B = 10 mT | 0.48 |
| B = 20 mT | 3.1 |

7 mm×7 mm Wafers in a Staggered Arrangement rate of charge per volume ranging from 28% to 40% permeability 60

T=60° C.

| | Total losses |
|---|---|
| B = 10 mT | 0.1 |
| B = 20 mT | 0.98 |

2 mm×2 mm Wafers Oriented Under a Magnetic Field rate of charge per volume ranging from 30% to 42% permeability 40

T=60° C.

| | Total losses |
|---|---|
| B = 10 mT | 0.05 |
| B = 20 mT | 0.19 |
| B = 30 mT | 0.57 |
| B = 40 mT | 1.36 |

⅛th Toroidal Wafers, 8 Strata rate of charge per volume ranging from 39 to 55% permeability 60

T=60° C.

| | Total losses |
|---|---|
| B = 10 mT | 0.09 |
| B = 20 mT | 0.45 |
| B = 30 mT | 1.2 |

Toroidal Wafers, 12 Strata rate of charge per volume ranging from 59% and 83% permeability 60

T=60° C.

| | Total losses |
|---|---|
| B = 10 mT | 0.02 |
| B = 20 mT | 0.18 |
| B = 30 mT | 0.51 |
| B = 40 mT | 1.07 |

Stacked Toroidal Wafers, Broken, Impregnated rate of charge per volume ranging from 40% to 56% permeability 60

T=60° C.

| | Total losses |
|---|---|
| B = 10 mT | 0.05 |
| B = 20 mT | 0.2 |
| B = 30 mT | 0.58 |
| B = 40 mT | 1.4 |

Figure 6A:
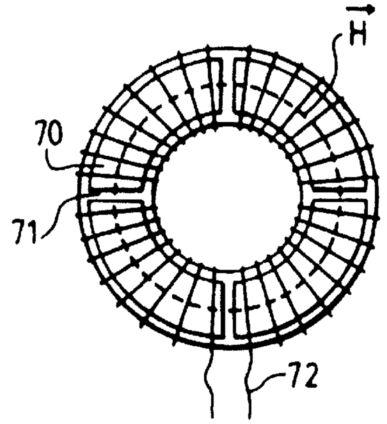
FIGS. 6*a*, 6*b* respectively show an inductor and a transformer according to the invention.
Figure 6B:
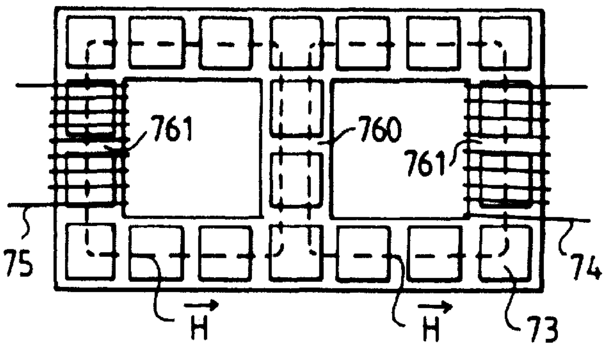

FIGS. 6*a*, 6*b* give a schematic view of an inductor and a transformer according to the invention.

The inductor of FIG. 6*a* has a toroidal core made of composite magnetic material according to the invention. This core is formed by quarter-toroid wafers 70 dispersed in the dielectric binder. There are several strata separated by the binder and each stratum has four wafers 70 separated by a gap 71. Around the core, there is a coil 72. The magnetic field $\vec{H}$ that is set up in the core is represented by a circle of dashes.

The transformer of FIG. 6*b* has an E-shaped core with rectangular legs including a central leg 760 and two ends 761, made of composite magnetic material according to the invention. This core has square-shaped wafers 73 embedded in the binder. Two coils 74, 75 around the end legs 761 contribute to forming the primary winding and the secondary winding of the transformer. The two coils could have been around the central leg 760. The magnetic field $\vec{H}$ set up in the core is represented by dashes. The main faces of the wafers are substantially parallel to the magnetic field $\vec{H}$.

The cores according to the invention have been shown in toroidal form or in an E-shaped form but the invention is not limited to these types. It can be applied to other types of cores such as U-shaped cores, pot-shaped cores etc.

What is claimed is:

1. A composite magnetic material comprising polycrystalline magnetic ceramic wafers dispersed in a dielectric binder, oriented so that their main faces are parallel to each other, wherein the wafers are not in contact with one another and form several strata separated by a layer of binder, said wafers being squares, torroids or torroidal portions and wherein the polycrystalline magnetic ceramic is a spinel ferrite corresponding to the formula $M_xZn_yFe_{2+\epsilon}O_4$ with $x+y+\epsilon=1$, where M is a manganese ion or a nickel ion.

2. A method for the making of a composite magnetic material according to claim 1, comprising the following steps:

preparing a ceramic magnetic powder of said spinel ferrite, preparing a casting slip from said ceramic magnetic powder, cutting out wafers from a film of the casting slip, sintering of the wafers, preparing the composite magnetic material from the sintered wafers by dispersing them in a binder, the main faces of the wafers being oriented parallel to each other and not being in contact with one another, and by forming with them several strata separated by a layer of binder said wafers being squares, torroids or torroidal portions.

3. A composite magnetic material comprising polycrystalline magnetic ceramic wafers dispersed in a dielectric binder, oriented so that their main faces are parallel to each other, wherein the wafers are not in contact with one another and form several strata separated by a layer of binder, the wafers belonging to neighboring strata being in columns and wherein the polycrystalline magnetic ceramic is a spinel ferrite corresponding to the formula $M_xZn_yFe_{2+\epsilon}O_4$ with $x+y+\epsilon=1$, where M is a manganese ion or a nickel ion.

4. A method for making of a composite magnetic material according to claim 3, comprising the following steps:

preparing a ceramic magnetic powder of said spinel ferrite, preparing a casting slip from said ceramic magnetic powder, cutting out wafers from a film of the casting slip, sintering of the wafers, preparing the composite magnetic material from the sintered wafers by dispersing them in a binder, the main faces of the wafers being oriented parallel to each other and not being in contact with one another, and by forming with them several strata separated by a layer of binder, the wafers belonging to neighboring strata being in columns.

5. A composite magnetic material comprising polycrystalline magnetic ceramic wafers dispersed in a dielectric binder, oriented so that their main faces are parallel to each other, wherein the wafers are not in contact with one another and form several strata separated by a layer of binder, said wafers having a thickness of 100 to 130 micrometers and where the polycrystalline magnetic ceramic is a spinel ferrite corresponding to the formula $M_xZn_yFe_{2+\epsilon}O_4$ with $x+y+\epsilon=1$, where M is a manganese ion or a nickel ion.

6. A method for the making of a composite magnetic material according to claim 5, comprising the following steps:

preparing a ceramic magnetic powder of said spinel ferrite, preparing a casting slip from said ceramic magnetic powder, cutting out wafers from a film of the casting slip, sintering of the wafers, preparing the composite magnetic material from the sintered wafers by dispersing them in a binder, the main faces of the wafers being oriented parallel to each other and not being in contact with one another, and by forming with them several strata separated by a layer of binder, the wafers having a thickness of 100 to 130 micrometers.

7. A method according to one of the claims 2, 4 and 6, wherein the orientation of the main faces of the wafers is selected from the group consisting of orientation by hand, orientation by vibration and orientation of a magnetic field.

* * * * *